Aug. 2, 1955 J. A. ARQUINT 2,714,533
PNEUMATIC CONVEYOR
Filed Sept. 3, 1952
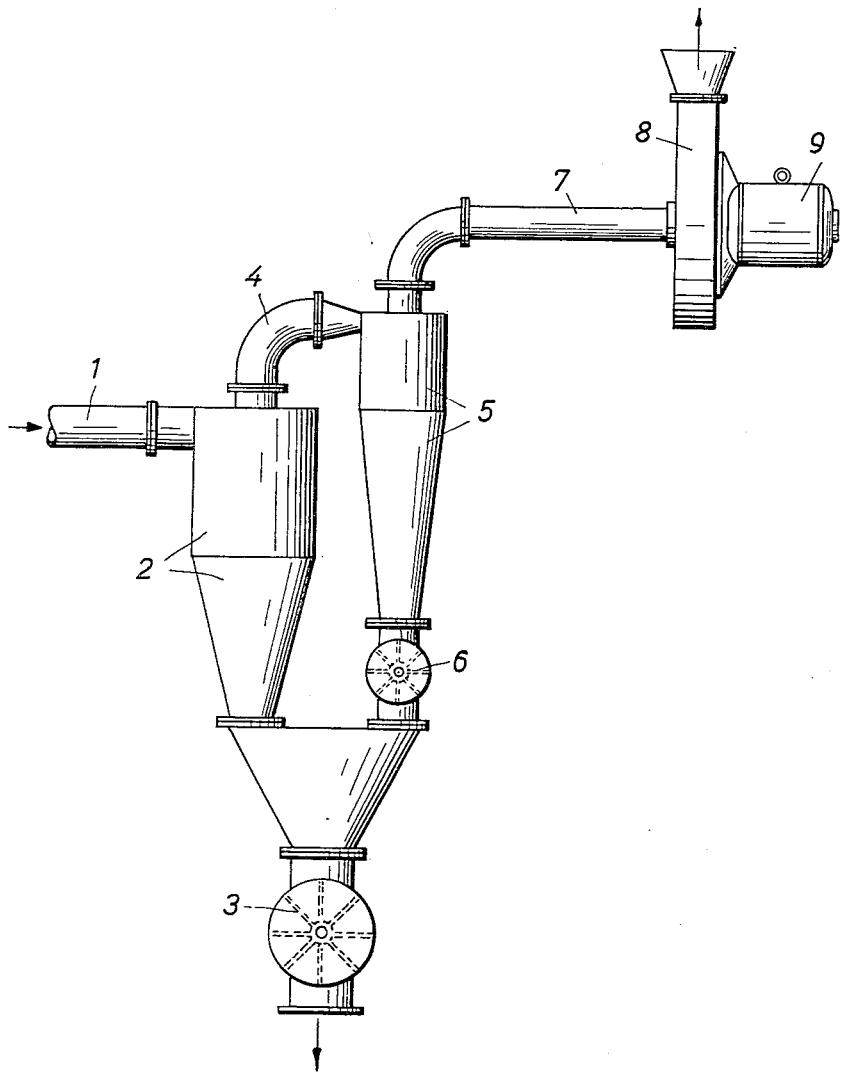
INVENTOR:
Johann Alois Arquint
By E. P. Goepel
his Attorney

United States Patent Office 2,714,533
Patented Aug. 2, 1955

2,714,533

PNEUMATIC CONVEYOR

Johann Alois Arquint, Bern, Switzerland, assignor to Gebruder Buhler, Uzwil, Switzerland Application September 3, 1952, Serial No. 307,649

Claims priority, application Switzerland September 6, 1951

1 Claim. (Cl. 302—11)

The present invention relates to a pneumatic conveyor comprising two subsequent separators, one of which in the following will be called pre-separator while the other will be the post-separator. These separators serve to separate from the conveying air the conveyed material at the destination of the latter and for this purpose they are provided with evacuating devices evacuating the separated material out of the conveyor system. Heretofore both, as well the pre-separator as the post-separator, have been connected with the atmosphere each through a separate evacuating device. As these devices have to evacuate the separated material against a relatively high pressure difference it is not possible to avoid the entering of false-air into the separators. This false-air substantially impairs the output of the separators and further involves an increase of the power required for the pneumatic conveying.

In the pneumatic conveyor with a pre- and a post-separator according to the present invention both, the pre-separator and the post-separator are connected with the atmosphere through a common evacuating device or air lock gate and a further evacuating device is inserted between the post-separator and said first-mentioned evacuating device or air lock gate.

As the pressure difference between the inlet and the outlet of said second evacuating device or air lock gate is very small, practically no false-air can enter the post-separator so that, in the conveyor according to the present invention the post-separator works substantially better, i. e. a higher degree of separation is obtained.

An embodiment of the invention is shown, by way of example, in the annexed drawing.

Coming through a conduit 1 the conveyed material enters the pre-separator 2 in which the largest part of the material is separated from the conveying air and directly falls into an evacuating device 3, which in the shown embodiment is formed by a rotating blade wheel, but which of course could be any other device suitable for this purpose. A conduit 4 connects the pre-separator 2 with a post-separator 5. A further evacuating device 6 is disposed between the post-separator 5 and the first-mentioned evacuating device 3.

The conveying air, which still contains small particles of the material, which were not eliminated in the pre-separator 2, leaves the latter through the conduit 4 and enters the post-separator 5, in which the rest of the conveyed material is separated from the conveying air. Due to the small pressure difference existing between inlet and outlet of the evacuating device or air lock gate 6, practically no false-air enters the post-separator 5 so that an excellent degree of separation is obtained in this post-separator, together with a substantial saving of power for the pneumatic conveying. By means of a motor 9, driving a fan 8, the conveying air is sucked from the post-separator 5 through a conduit 7.

What I claim is:

In a pneumatic conveyor having a pre-separator and a post-separator for separating conveyed material from the conveying air under subatmospheric pressure, and a first air lock gate common to said separators for connecting them with the atmosphere, the combination of fluid flow means for connecting said separators, means for drawing air from said post-separator, and a second air lock gate between said post-separator and said first air lock gate for reducing the pressure difference between the atmosphere and the air in said post-separator.

References Cited in the file of this patent

UNITED STATES PATENTS

| 2,423,850 | Peery | July 15, 1947 |
| 2,459,908 | Alikonis | Jan. 25, 1949 |
| 2,474,314 | Koehne | June 28, 1949 |